US009519993B2

(12) United States Patent
Kawasaki et al.

(10) Patent No.: US 9,519,993 B2
(45) Date of Patent: Dec. 13, 2016

(54) MEDICAL IMAGE PROCESSING APPARATUS

(71) Applicants: Tomohiro Kawasaki, Otawara (JP); Kensuke Shinoda, Otawara (JP); Satoshi Wakai, Nasushibara (JP)

(72) Inventors: Tomohiro Kawasaki, Otawara (JP); Kensuke Shinoda, Otawara (JP); Satoshi Wakai, Nasushibara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 257 days.

(21) Appl. No.: 13/684,411

(22) Filed: Nov. 23, 2012

(65) Prior Publication Data

US 2013/0135307 A1 May 30, 2013

(30) Foreign Application Priority Data

Nov. 24, 2011 (JP) ................................ 2011-255822

(51) Int. Cl.
*G06T 15/08* (2011.01)
*G06T 19/00* (2011.01)

(52) U.S. Cl.
CPC ............... *G06T 15/08* (2013.01); *G06T 19/00* (2013.01); *G06T 2210/41* (2013.01)

(58) Field of Classification Search
CPC ................................ G06T 15/08; G06T 17/20
See application file for complete search history.

(56) References Cited

U.S. PATENT DOCUMENTS

2004/0017948 A1* 1/2004 Kuo .............................. 382/232
2006/0241379 A1 10/2006 Greiser et al.
(Continued)

FOREIGN PATENT DOCUMENTS

JP H04-241844 8/1992
JP 2006-087827 A 4/2006
(Continued)

OTHER PUBLICATIONS

Combined Chinese Office Action and Search Report issued Jul. 18, 2014 in Patent Application No. 201210479189.8 (with English translation of categories of cited documents and Japanese translation).
(Continued)

*Primary Examiner* — Michelle Chin
(74) *Attorney, Agent, or Firm* — Oblon, McClelland, Maier & Neustadt, L.L.P.

(57) ABSTRACT

A medical image processing apparatus according to an embodiment for visualization of each of plural captured image volume data having time of day information includes a generator configured to generate interpolation volume data for interpolation in the plural captured image volume data, based on the plural captured image volume data, and a display unit configured to visualize and display the plural captured image volume data and the interpolation volume data. The generator extracts a feature region in the captured image volume data, and is configured such that processing for generating the interpolation volume data for the feature region is different from processing for generating the interpolation volume data for other regions, so as to suppress a change in shape of the feature region.

15 Claims, 11 Drawing Sheets

START
S1 NONLINEAR ALIGNMENT BETWEEN CAPTURED IMAGE VOLUME DATA (CALCULATIONS OF AMOUNT OF SHIFT OF EACH VOXEL)
S2 EXTRACTION OF CALCIFIED REGION IN ENTIRE CAPTURED IMAGE VOLUME DATA
S3 CREATION OF INTERPOLATION DATA BETWEEN CAPTURED IMAGE VOLUME DATA IN NON-CALCIFIED REGION
S4 CREATION OF INTERPOLATION DATA BETWEEN CAPTURED IMAGE VOLUME DATA IN CALCIFIED REGION
S5 THREE-DIMENSIONAL SYNTHESIS OF INTERPOLATION DATA IN NON-CALCIFIED REGION AND INTERPOLATION DATA IN CALCIFIED REGION
S6 GENERATION OF THREE-DIMENSIONAL TIME-VARYING IMAGE
END

(56) References Cited

U.S. PATENT DOCUMENTS

| | | | | |
|---|---|---|---|---|
| 2009/0154787 | A1 | 6/2009 | Bertram et al. | |
| 2010/0172562 | A1* | 7/2010 | Satoh et al. | 382/131 |
| 2012/0188351 | A1* | 7/2012 | Kaku | 348/65 |

FOREIGN PATENT DOCUMENTS

| | | | |
|---|---|---|---|
| JP | 2006087827 | * | 4/2006 |
| JP | 2007-205 | | 1/2007 |
| JP | 2007-181674 | | 7/2007 |
| JP | 2011-067279 | | 4/2011 |
| JP | 2011-110282 | | 6/2011 |

OTHER PUBLICATIONS

Japanese Office Action issued Aug. 11, 2015, in Patent Application No. 2011-255822.

* cited by examiner

MEDICAL IMAGE PROCESSING APPARATUS

CROSS-REFERENCE TO THE RELATED APPLICATION

This application is based on and claims the benefit of priority from Japanese Patent Application No. 2011-255822, filed on Nov. 24, 2011; the entire contents of which are incorporated herein by reference.

FIELD

Embodiments described herein relate generally to a medical image processing apparatus.

BACKGROUND

Medical imaging diagnostic equipment generally includes a medical image capturing apparatus for capturing medical images of the interior of the body of a subject, and a medical image processing apparatus for processing the medical images. Examples of the medical image capturing apparatus include an X-ray CT apparatus (an X-ray computed tomography apparatus), and MRI (a magnetic resonance imaging diagnostic apparatus). Such a medical image capturing apparatus acquires volume data as information on the interior of the body of the subject by capturing images.

The medical image processing apparatus may use volume rendering, for example, as a visualization technology for visualization of the volume data. The volume rendering generates three-dimensional images from the volume data for example by a ray casting method of rendering an object by tracing light rays leading from an observer's eye to pixels (i.e. 3-D rendering). Further, the three-dimensional images may be sequenced in time series to form a three-dimensional time-varying image (i.e. 4-D rendering).

Here, observation of an aortic valve on a three-dimensional time-varying image, as seen from the direction of an aortic root, is most suitable for image diagnosis for the purpose of making a treatment plan for aortic stenosis, for example, deciding on valvuloplasty, valve replacement, or the like. Specifically, while the valve is moving, observations of changes in a valve orifice area are made taking into account the influence of a calcified part around the valve.

Because of a fast movement of the valve in itself, however, time-varying image reproduction which provides a simple sequential display of medical images (for example, CT images) captured in time series is deficient in the number of frames and hence is inadequate for observation of the movement of the valve. Attention is therefore being given to 4-D rendering with high time resolution which reproduces a smooth movement of the valve by generating finer time-series volume data from time-series volume data by interpolation processing.

In the above-described 4-D rendering with high time resolution, however, the smooth movement of the valve is reproduced by the interpolation processing based on nonlinear alignment, while on the other hand, the calcified part deposited on the valve becomes distorted from the nonlinear alignment. This makes it impossible to accurately diagnose the influence of the calcified part upon the changes in the valve orifice area.

A constituent of the calcified part is inherently calcium which is the same as that of a bone, and thus the calcified part undergoes no distortion by the movement of the valve, and therefore, after the interpolation processing, the calcified part does not assume its precise shape. This makes it impossible for a diagnostician to accurately diagnose influences upon the calcified part, or equivalently, a non-distorted feature part and its surroundings.

DETAILED DESCRIPTION

According to one embodiment, a medical image processing apparatus for visualization of each of plural captured image volume data having time of day information includes a generator configured to generate interpolation volume data for interpolation in the plural captured image volume data, based on the plural captured image volume data; and a display unit configured to visualize and display the plural captured image volume data and the interpolation volume data. The generator extracts a feature region in the captured image volume data, and is configured such that processing for generating the interpolation volume data for the feature region is different from processing for generating the interpolation volume data for other regions, so as to suppress a change in shape of the feature region.

Also, according to another embodiment, a medical image processing apparatus includes a region setting unit configured to set a feature region on plural captured image volume data captured in time series; a feature region interpolation data generator configured to generate feature region interpolation data between the captured image volume data in the feature region; a non-feature region interpolation data generator configured to generate non-feature region interpolation data between the captured image volume data in a non-feature region which is a region other than the feature region, by nonlinear alignment; a synthetic interpolation data generator configured to generate synthetic interpolation data by three-dimensionally synthesizing the feature region interpolation data and the non-feature region interpolation data; and an image generator configured to generate a three-dimensional time-varying image formed of three-dimensional images sequenced in time series, by using the synthetic interpolation data and the plural captured image volume data.

Also, according to yet another embodiment, a medical image processing apparatus includes a target range decision unit configured to determine a target range as an object of processing from plural captured image volume data captured in time series; and an image generator configured to generate a three-dimensional time-varying image formed of three-dimensional images sequenced in time series, by interpolating new volume data between the captured image volume data in the target range.

One embodiment will be described with reference to the drawings.

Figure 1:
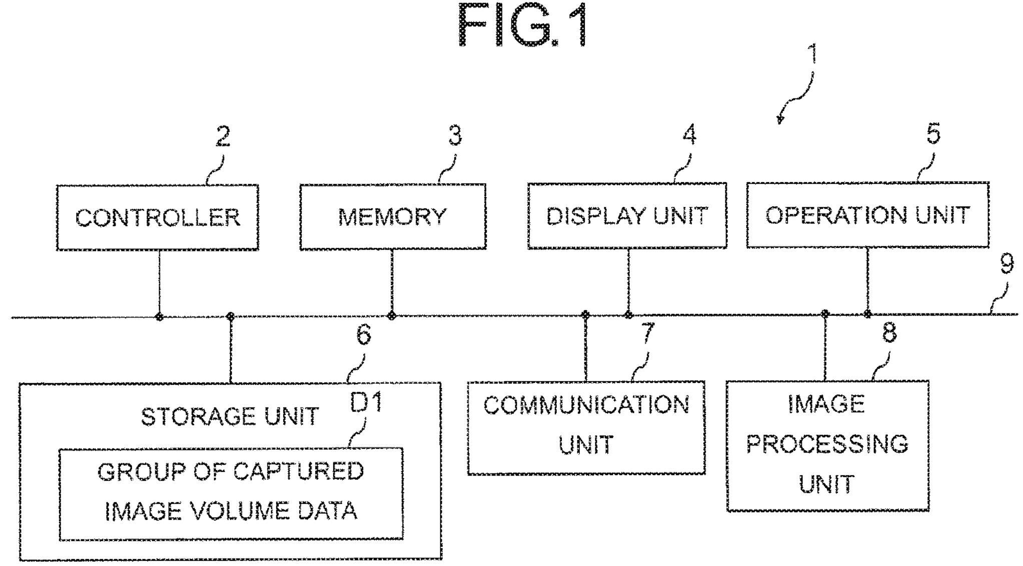
FIG. 1 is a block diagram showing a schematic configuration of a medical image processing apparatus according to one embodiment.

As shown in FIG. 1, a medical image processing apparatus 1 according to the embodiment includes a controller 2 such as a CPU (central processing unit) which performs centralized control on units, a memory 3 such as ROM (read only memory) or RAM (random access memory), a display unit 4 which displays various images such as medical images, an operation unit 5 which receives input operations from an operator, a storage unit 6 which stores various programs, various data (for example, a group D1 of captured image volume data), and the like, a communication unit 7 which provides communications with an external apparatus, and an image processing unit 8 which processes the medical images. These units are electrically connected by a bus-line 9, for example.

The controller 2 controls the units based on the various programs, the various data or the like stored in the memory 3 or the storage unit 6. Particularly, the controller 2 executes a series of data processing for data calculations or manipulations or the like, display processing for display of the medical images, or the like, based on the various programs or the various data.

The memory 3 is the memory which stores a boot program and the like executed by the controller 2, and also functions as a work area for the controller 2. Incidentally, the boot program is loaded and executed by the controller 2 at the time of booting of the medical image processing apparatus 1.

The display unit 4 is a display device which provides color displays of various images such as two-dimensional images, three-dimensional images and a three-dimensional time-varying image (or four-dimensional image). A liquid crystal display, a CRT (cathode-ray tube) display, or the like, for example, is available for use as the display unit 4.

The operation unit 5 is an input unit on which the operator performs input operations, and is the input unit which receives various input operations such as starting of image display, switching between images, and various settings. An input device such as a mouse or a keyboard, for example, is available for use as the operation unit 5.

The storage unit 6 is a storage device which stores the various programs, the various data, and the like, and stores the group D1 of captured image volume data transmitted through a wire or wireless network, for example. A magnetic disk device, a semiconductor disk device (e.g. a flash memory), or the like, for example, is available for use as the storage unit 6.

Here, the group D1 of captured image volume data is formed by plural volume data obtained by capturing images in time series (or plural volume data having time of day information). The volume data is acquired by a medical image capturing apparatus such as an X-ray CT apparatus (an X-ray computed tomography apparatus) or MRI (a magnetic resonance imaging diagnostic apparatus), and is retained in the storage unit 6 via the communication unit 7, or is temporarily retained in a medical image storage apparatus such as an image server and then retained as needed in the storage unit 6 via the communication unit 7.

The communication unit 7 is a device which provides communications with the external apparatus through a wireless or wire network such as a LAN (local area network) or the Internet. A LAN card, a modem, or the like is available for use as the communication unit 7. Incidentally, the external apparatuses include the medical image capturing apparatuses such as the X-ray CT apparatus and the MRI, and the medical image storage apparatus such as the image server.

The image processing unit 8 is a device which performs image processing on the group D1 of captured image volume data. For example, the image processing unit 8 functions as a generator to interpolate new volume data in the group D1 of captured image volume data between the captured image volume data (or generate interpolation volume data) and generate time-series rendering images with high time resolution obtained by volume rendering, or equivalently, a three-dimensional time-varying image formed of three-dimensional images sequenced in time series.

Here, the volume rendering is a visualization technology for visualization of the volume data, in which a ray casting method, for example, is used to generate three-dimensional images from the volume data. Specifically, the generation of the three-dimensional images is accomplished by determining a certain direction of a line of sight (or a direction of projection of rays of projection light) to the volume data, performing ray tracing processing from a predetermined observer's eye, and outputting the integral or weighted cumulative sum of voxel values (e.g. luminance values, etc.) on the line of sight to image pixels in a plane of projection thereby to stereoscopically extract an internal organ or the like.

Next, the image processing unit 8 will be described in detail.

Figure 2:
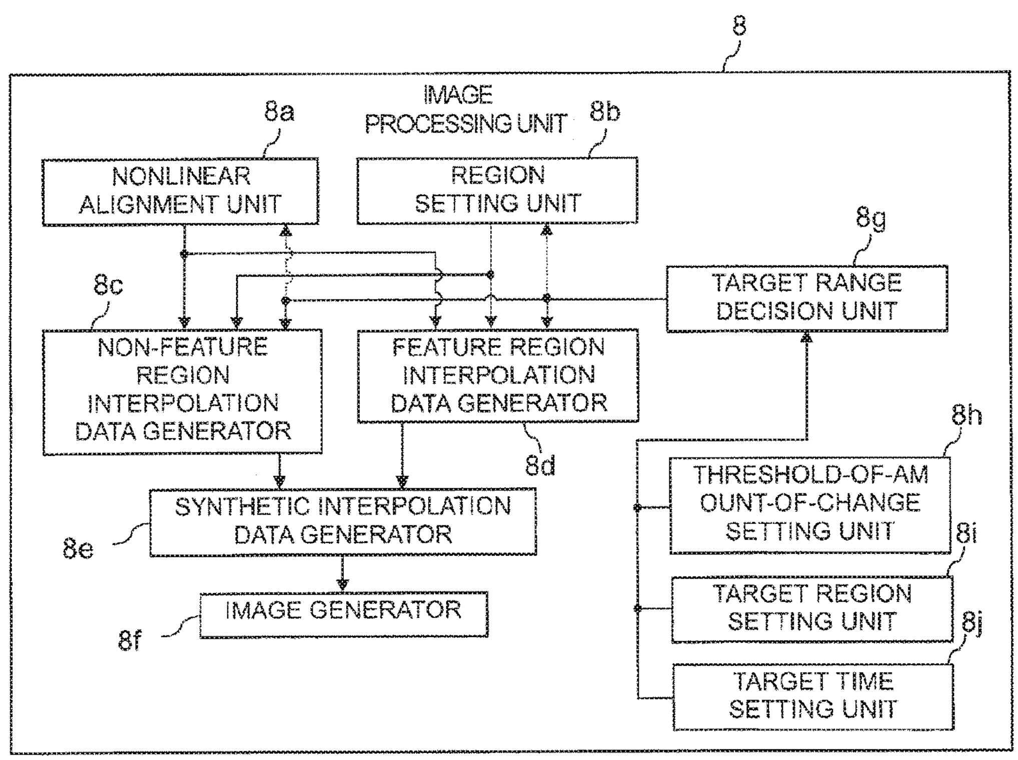
FIG. 2 is a block diagram showing a schematic configuration of an image processing unit included in the medical image processing apparatus shown in FIG. 1.

As shown in FIG. 2, the image processing unit 8 includes a nonlinear alignment unit 8*a* which performs nonlinear alignment between captured image volume data on the group D1 of captured image volume data, a region setting unit 8*b* which sets a non-distorted feature region on the group D1 of captured image volume data, a non-feature region interpolation data generator 8*c* which generates non-feature region interpolation data other than the feature region, a feature region interpolation data generator 8*d* which generates feature region interpolation data, a synthetic interpolation data generator 8*e* which generates synthetic interpolation data by three-dimensionally synthesizing the non-feature region interpolation data and the feature region interpolation data, and an image generator 8*f* which generates a three-dimensional time-varying image by performing interpolation of volume data by using the synthetic interpolation data.

Figure 3:
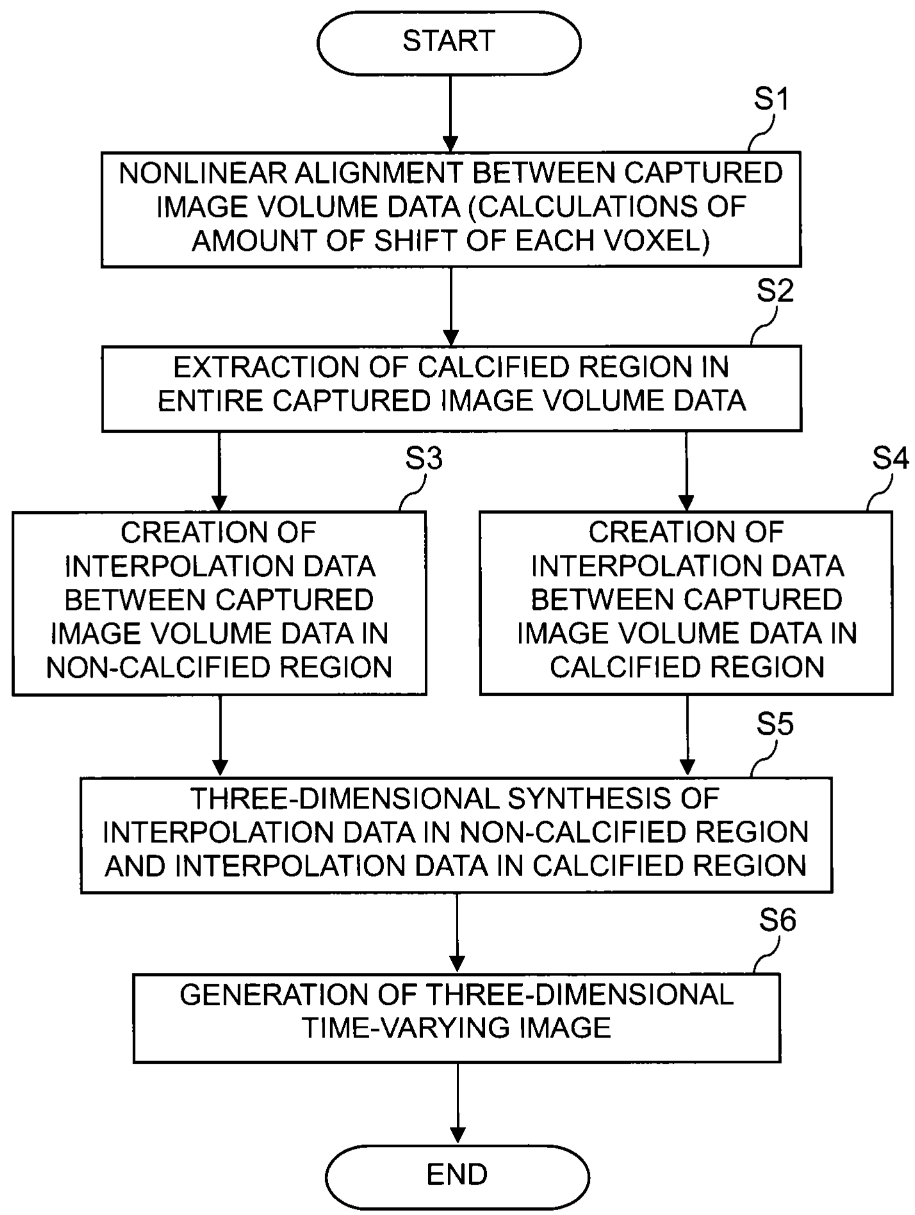
FIG. 3 is a flowchart showing a flow of image processing performed by the image processing unit shown in FIG. 2.

The nonlinear alignment unit 8*a* performs nonlinear alignment between captured image volume data on the group D1 of captured image volume data, or equivalently, performs calculations of the amount of shift of each voxel (at step S1 in FIG. 3). Thereby, nonlinear shift amount information as calculated results is obtained.

The region setting unit 8*b* sets a non-distorted feature region and discriminates between the non-distorted feature region and a non-feature region other than the non-distorted feature region. The region setting unit 8*b* extracts a calcified region in the group D1 of captured image volume data, or equivalently, in the entire captured image volume data (at step S2 in FIG. 3). In this extraction, for example, a region having a CT value equal to or more than 900 HU is extracted as the calcified region since the CT value of the calcified region is of the order of 1000 HU. Thereby, a discrimination is made between the calcified region and a non-calcified region (or soft tissue).

Here, a constituent of the calcified region is calcium which is the same as that of a bone, and thus, the calcified region may possibly move but undergoes no distortion by movement of surroundings such as a valve (as an example of a pathologically changed part which can move). Therefore, the calcified region is the non-distorted feature region whose shape does not change, and the non-calcified region is the non-feature region. Incidentally, the feature region is not limited to the calcified region but, for example, may be hardened tissue (or matter) other than calcified one, or may be anything, provided that it is the non-distorted region.

The non-feature region interpolation data generator 8*c* creates interpolation data between captured image volume data in the non-calcified region, or equivalently, non-feature region interpolation data (at step S3 in FIG. 3). In the creation of the non-feature region interpolation data, the non-feature region interpolation data is created from the group D1 of captured image volume data sequenced in time series, based on the nonlinear shift amount information obtained by step S1.

Figure 4:
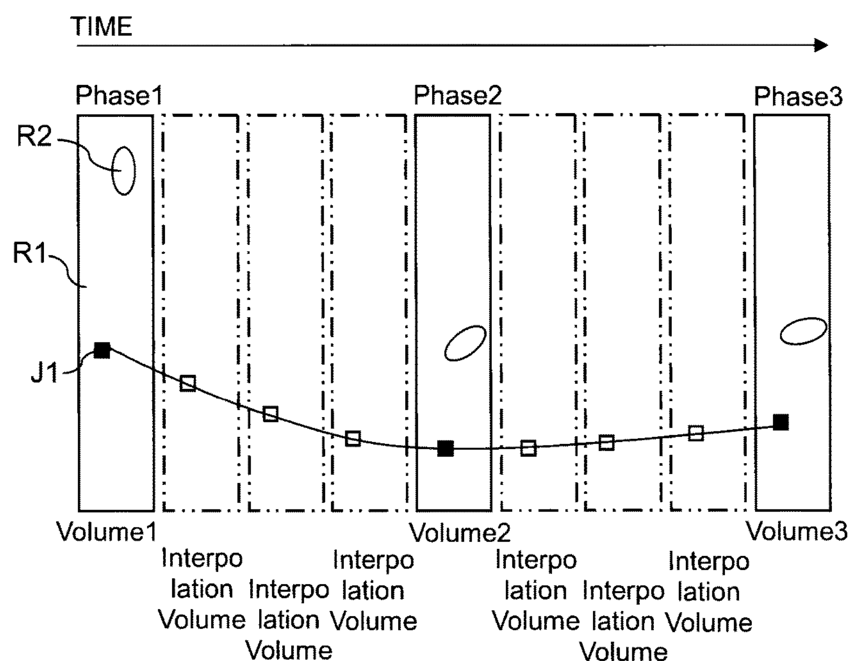
FIG. 4 is an explanatory diagram of assistance in describing generation of non-feature region interpolation data in the image processing shown in FIG. 3.

Specifically, as shown in FIG. 4, the position of a center of gravity J1 of a non-calcified region R1 is shifted based on the nonlinear shift amount information, and thereby, the non-feature region interpolation data is generated as interpolation volume data in the non-calcified region R1.

The feature region interpolation data generator 8*d* creates interpolation data between captured image volume data in the calcified region, or equivalently, feature region interpolation data (at step S4 in FIG. 3). In the creation of the feature region interpolation data, the feature region interpolation data is created from the group D1 of captured image volume data sequenced in time series, based on linear shift amount information obtained by calculation, in addition to the nonlinear shift amount information obtained by step S1.

Figure 5:
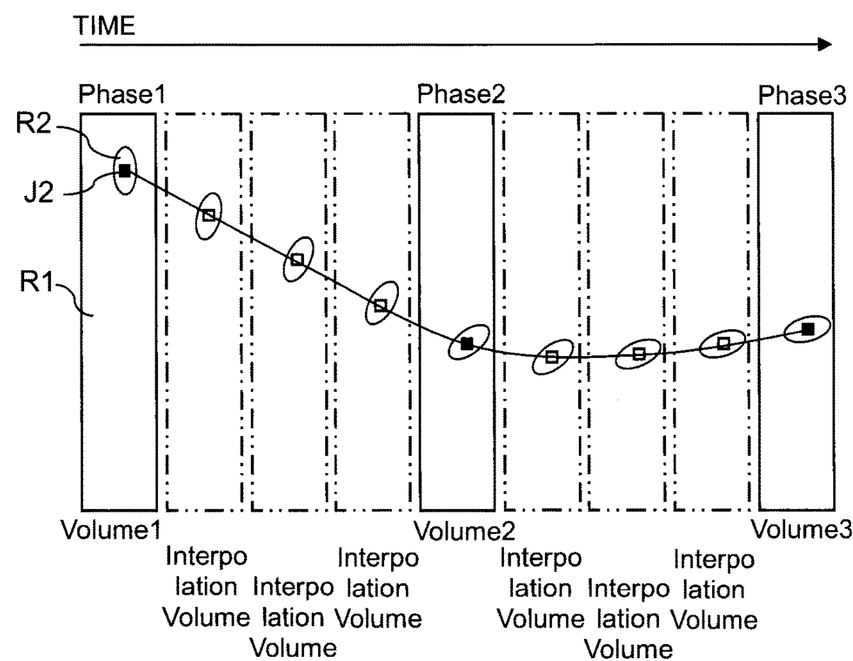
FIG. 5 is an explanatory diagram of assistance in describing generation of feature region interpolation data in the image processing shown in FIG. 3.

Specifically, as shown in FIG. 5, the position of a center of gravity J2 of a calcified region R2 is shifted based on the nonlinear shift amount information, and further, the calcified region R2 in itself is shifted by linear alignment, or equivalently, the calcified region R2 is rotated in three dimensions, based on the amount of linear rotation of the calcified region R2 (or the linear shift amount information), and thereby, the feature region interpolation data is generated as interpolation volume data in the calcified region R2. At this time, the position of the center of gravity J2 of the calcified region R2 is processed by nonlinear alignment; however, the calcified region R2 in itself is processed by the linear alignment based on the amount of linear rotation, and therefore, the calcified region R2 does not become distorted.

Here, the position of the center of gravity J2 of the calcified region R2 is shifted based on the same nonlinear shift amount information as that used to shift the non-calcified region R1, for example the valve, other than the calcified region R2, and therefore, little misalignment occurs between the calcified region R2 and the valve on which the calcified part is deposited. In order to improve alignment accuracy, however, the amount of shift or the amount of linear rotation of the calcified region R2 may be calculated taking into account the amount of nonlinear shift of the calcified region R2 taken as a whole, rather than one point which is the position of the center of gravity J2 of the calcified region R2. Specifically, plural other points around the position of the center of gravity J2, in the calcified region R2, are shifted based on the nonlinear shift amount information.

The synthetic interpolation data generator 8*e* generates synthetic interpolation data by three-dimensionally synthesizing the non-feature region interpolation data as the interpolation data in the non-calcified region R1 and the feature region interpolation data as the interpolation data in the calcified region R2 (at step S5 in FIG. 3). Thereby, the synthetic interpolation data is generated as correction volume data for implementation of 4-D rendering with high time resolution.

The image generator 8*f* generates a three-dimensional time-varying image formed of three-dimensional images sequenced in time series, by interpolating new volume data between the captured image volume data by using the synthetic interpolation data generated by the synthetic interpolation data generator 8*e* (at step S6 in FIG. 3). Thereby, the 4-D rendering with high time resolution is implemented.

Here, generally, when correction processing based on nonlinear alignment is evenly carried out without discriminating between the main part of an aortic valve and the calcified region, a change in shape of the calcified part occurs on a three-dimensional time-varying image. Actually, however, the main part of the aortic valve changes in shape with a change in time, whereas the calcified part does not change in shape with a change in time. Therefore, the main part of the aortic valve and the calcified region are processed into highly time-resolved form by separate interpolation processing, and processed results are synthesized to make accurate reproductions of a time-varying image with high time resolution, thereby enabling accurate diagnosis of the influence of the calcified part upon changes in a valve orifice area.

Returning to FIG. 2, the image processing unit 8 further includes a target range decision unit 8*g* which determines a target range as an object of interpolation processing, a threshold-of-amount-of-change setting unit 8*h* which sets a threshold of the amount of change to determine the target range, a target region setting unit 8*i* which sets a target region to determine the target range, and a target time setting unit 8*j* which sets a target time to determine the target range.

The target range decision unit 8*g* determines a target range as an object of interpolation processing from the group D1 of captured image volume data. The target range decision unit 8*g* determines the target range based on various decision methods (for example, combinations of some decision methods). At this time, information used to determine the target range is acquired from any one of the threshold-of-amount-of-change setting unit 8*h*, the target region setting unit 8*i* and the target time setting unit 8*j*.

Figure 6:
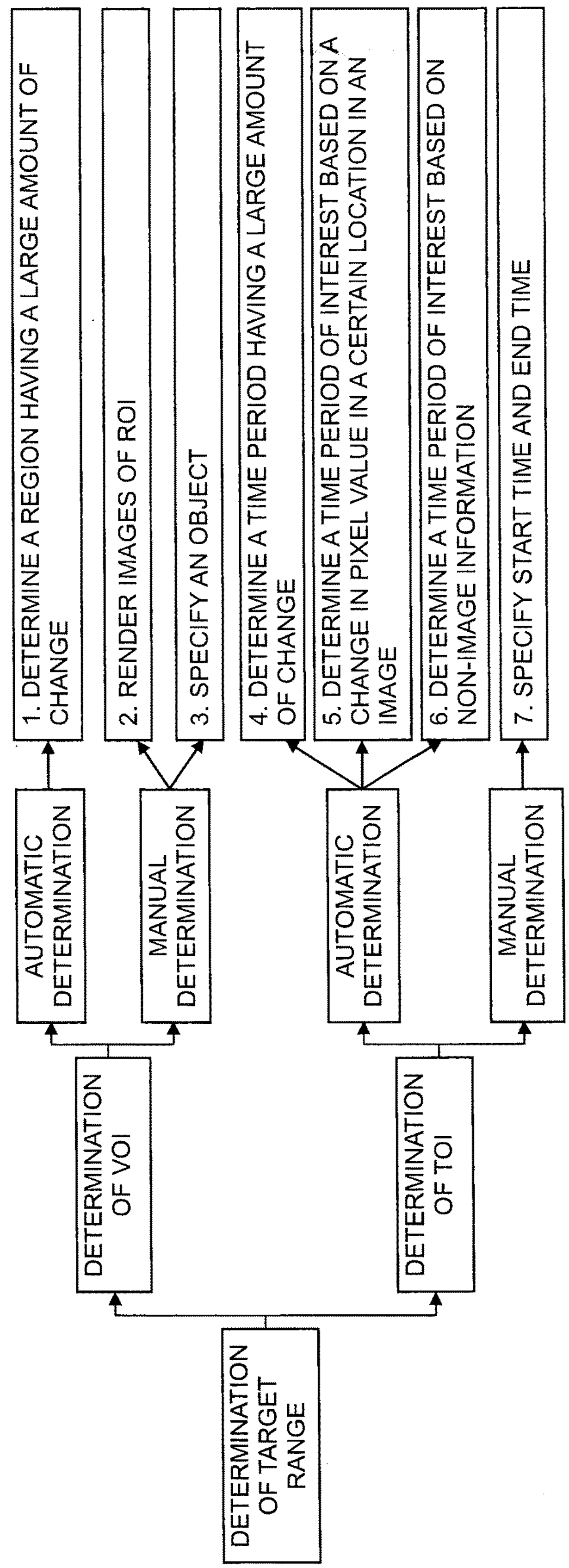
FIG. 6 is an explanatory diagram of assistance in describing methods for determining a target range.

Here, as shown in FIG. 6, methods for determining a target range are divided into a method for determining VOI (Volume Of Interest) and a method for determining TOI (Time Of Interest), which are each subdivided into an automatic determination method and a manual determination method.

The automatic determination of VOI is to "determine a region having a large amount of change," which is numbered "1" herein and in FIG. 6. For example, as a result of nonlinear alignment between captured image volume data, a region of a group of voxels having larger amounts of shift than a previously specified threshold value is determined and is defined as a processing object.

Also, the manual determination of VOI is to "render images of ROI (Region Of Interest)," which is numbered "2" herein and in FIG. 6. For example, a target region is specified by rendering 3-D images of ROI on three-dimensional images and is defined as a processing object.

Further, the manual determination of VOI is to "specify an object," which is numbered "3" herein and in FIG. 6. For example, a processing object is specified from a segmentation object created previously.

Also, the automatic determination of TOI is to "determine a time period having a large amount of change," which is numbered "4" herein and in FIG. 6. For example, as a result of nonlinear alignment between captured image volume data, a group of volume data during a time period having a larger amount of average shift in volume data (for example, VOI) than a previously specified threshold value is defined as a processing object.

Further, the automatic determination of TOI is to "determine a time period of interest based on a change in pixel value in a certain location in an image," which is numbered "5" herein and in FIG. 6. For example, a time period of interest is determined from the amount of change in pixel value in a certain location in volume data, and a group of volume data during the determined time period is defined as a processing object.

In addition, the automatic determination of TOI is to "determine a time period of interest based on non-image information," which is numbered "6" herein and in FIG. 6. For example, a time period of interest is determined from a feature of the value of non-image information such as an electrocardiographic waveform (for example, a waveform value or the like), and a group of volume data during the determined time period is defined as a processing object.

Also, the manual determination of TOI is to "specify start time and end time," which is numbered "7" herein and in FIG. 6. For example, a time period of interest is specified on a time density curve or the like by a UI (user interface) such as bars indicating the start time and the end time and is defined as a processing object.

These decision methods are used in combination. It is to be noted at this point that the order in which decision processes are performed may be optimized thereby to reduce unnecessary computational processing and thus reduce processing time in total. For example, when the manual determination of VOI and the automatic determination of TOI are used in combination, it is desirable that the manual determination of VOI be made earlier than the automatic determination of TOI, while conversely, when the automatic determination of VOI and the manual determination of TOI are used in combination, it is desirable that the manual determination of TOI be made earlier than the automatic determination of VOI.

An example of a means for setting the information used to determine the target range as described above is that setting images corresponding to the decision methods are displayed on the display unit 4 and the operator performs input operations on the operation unit 5 to provide various inputs to the setting images. The threshold-of-amount-of-change setting unit 8*h*, the target region setting unit 8*i* and the target time setting unit 8*j* set various data according to the various inputs. The target range decision unit 8*g* determines the target range of interpolation processing from the group D1 of captured image volume data, based on the various data.

Figure 7:
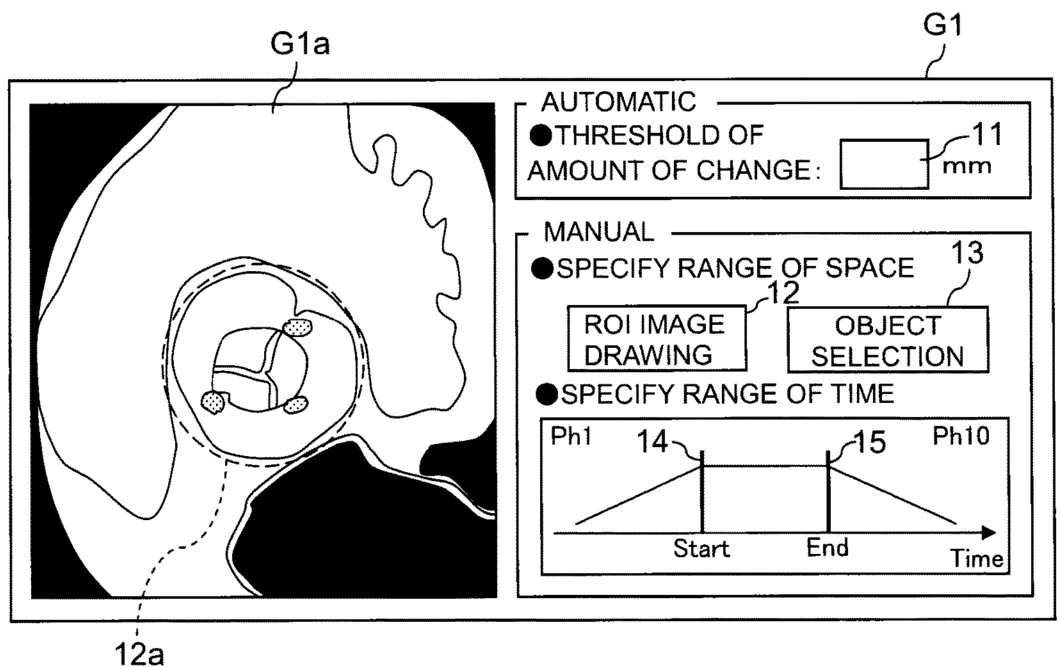
FIG. 7 is an illustration showing one example of a setting image to set information used to determine the target range.

Here, one example of the setting images is a setting image G1 as shown in FIG. 7. The setting image G1 contains a three-dimensional image G1*a* representing objects (for example, the main part of the aortic valve and its surroundings and the like), and is further provided with an input space (or an input field) 11 into which the threshold of the amount of change is entered, a ROI image drawing button 12 to specify a range of space, an object selection button 13 to select an object, a start bar 14 and an end bar 15 to specify a range of time, and so on.

When the operator performs input operations on the keyboard or the like as the operation unit 5 to enter a numeric value into the input space 11 in the setting image G1, the threshold-of-amount-of-change setting unit 8*h* sets the numeric value as the threshold of the amount of change used to determine the target range. Incidentally, the amount of change refers to the amount of shift of tissue (or matter) between volume data.

Also, when the operator performs input operations on the mouse or the like as the operation unit 5 to click on the ROI image drawing button 12, the drawing of an image of ROI is enabled. Then, the operator performs input operations on the mouse or the like as the operation unit 5 to draw an image of ROI 12*a* on the three-dimensional image G1*a*. In response to this, the target region setting unit 8*i* sets the ROI 12*a* as a space region of the processing object.

Also, when the operator performs input operations on the mouse or the like as the operation unit 5 to click on the object selection button 13, a subframe having a listing of object names such as the aortic valve, the left atrioventricular valve and the right atrioventricular valve is displayed. The operator clicks on a desired object name of the object names in the subframe to select an object as the processing object. In response to this, the target region setting unit 8*i* sets the selected object as the space region of the processing object.

Also, the operator performs input operations on the mouse or the like as the operation unit 5 to effect sliding movement of the start bar 14 and the end bar 15 and thereby specify the start time and the end time indicating the range of time. In response to this, the target time setting unit 8*j* sets a time period of the processing object, based on the specified start time and end time.

Here, the technology of 4-D rendering with high time resolution generally involves generating large amounts of volume data by interpolation calculations, and performing rendering processing on the large amounts of volume data. This consumes a vast amount of computational processing time, which is caused by unnecessary computational processing. In other words, a desired range to be actually observed (or analyzed) at high time resolution is only a very limited target region or time period in the entire volume data, and volume data interpolation and rendering processing performed on other regions cause unwanted increases in the amount of calculation time and the amount of memory used.

For example, for diagnosis, the desired range to be observed or analyzed at high time resolution is a location or time period having a large amount of shift (or change), a range in VOI centered at a pathologically changed part as an object of observation or analysis, a range in TOI based on non-image information (for example, an electrocardiographic waveform or the like) or based on a change in pixel value in a certain location in an image, or the like.

Therefore, high time resolution processing is applied only to a certain range of interest (e.g. VOI, TOI, etc.) as described above thereby to reduce the computational processing time and the amount of memory used, thus enabling a diagnostician to comfortably observe or analyze the range of interest without waiting time. Also, the range of interest as the object of observation is displayed alone at high time resolution thereby to enable the diagnostician to make observations focusing on the range of interest.

Incidentally, the units of the image processing unit 8 may be configured as hardware such as electrical circuitry, or may be configured as software such as programs to perform their functions. Also, the units may be configured as a combination of both of these.

Next, the image processing and the display processing performed by the medical image processing apparatus 1 will be described with reference to First to Third Examples. Incidentally, various data for use in the processing are retained in the storage unit 6 temporarily or for the long term, as needed.

First Example

Description will be given with reference to FIGS. 8 and 9 with regard to First Example in which the above-described first and fourth decision methods (see FIG. 6) are used in combination as the method for determining a target range. Incidentally, captured image volume data is illustrated in FIG. 9 by way of example as having Phases 1 to 4.

Figure 8:
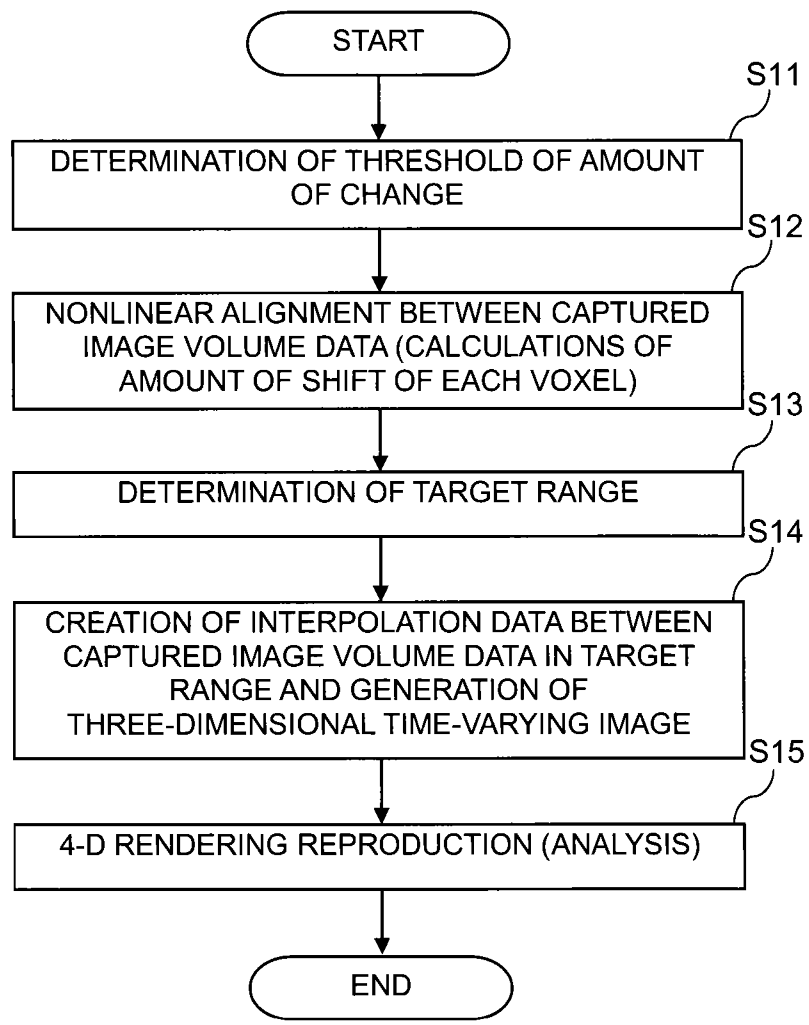
FIG. 8 is a flowchart showing a flow of image processing and display processing in First Example.
Figure 9:
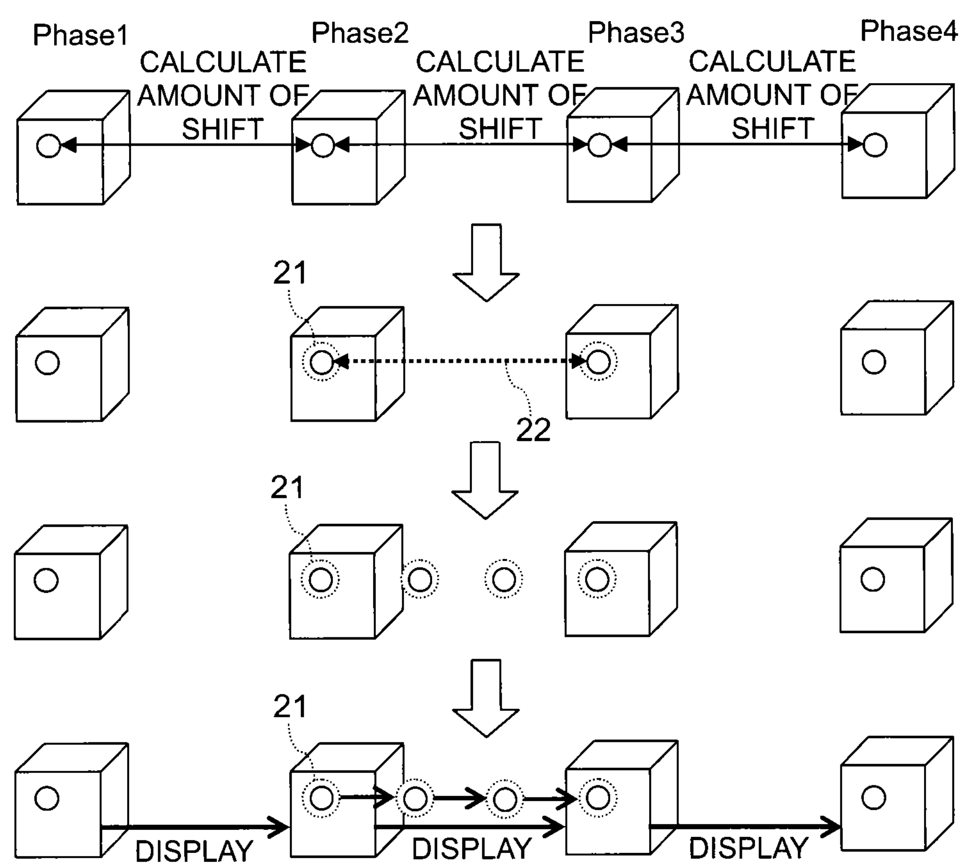
FIG. 9 is an explanatory diagram of assistance in describing the image processing and the display processing shown in FIG. 8.

As shown in FIG. 8, a threshold of the amount of change is determined (at step S11). In step S11, the threshold-of-amount-of-change setting unit 8*h* sets the threshold of the amount of change according to input operations which the operator performs on the operation unit 5. For example, when the operator operates the operation unit 5 to enter a numeric value into the input space 11 in the setting image G1 (see FIG. 7), the numeric value is set as the threshold of the amount of change.

Upon completion of step S11, nonlinear alignment between captured image volume data is performed (at step S12). In step S12, as shown in FIG. 9, the nonlinear alignment between the captured image volume data, or equivalently, calculations of the amount of shift of each voxel, is performed to obtain nonlinear shift amount information as calculated results.

Upon completion of step S12, a target range is determined (at step S13). In step S13, the target range decision unit 8*g* determines the target range as an object of processing from the group D1 of captured image volume data. Specifically, as shown in FIG. 9, a region of a group of voxels having larger amounts of shift than the threshold of the amount of change set according to step S11 is determined as VOI 21, based on the nonlinear shift amount information obtained by step S12, and likewise, a time period having a larger amount of shift is determined as TOI 22, and the VOI 21 and the TOI 22 are determined as the target range of the processing object. Incidentally, in FIG. 9, the TOI 22 is present between Phase 2 and Phase 3.

Upon completion of step S13, the creation of interpolation data between captured image volume data in the target range and the generation of time-series three-dimensional images are performed (at step S14). In step S14, as shown in FIG. 9, the above-described interpolation processing (see FIG. 3) is performed on the captured image volume data in the target range. However, the processing of step S1 shown in FIG. 3 is omitted since the processing has been executed at step S12. Thereby, interpolation volume data in the target range, or equivalently, feature region interpolation data and non-feature region interpolation data, are generated, and the generated data are three-dimensionally synthesized to produce a three-dimensional time-varying image formed of three-dimensional images sequenced in time series (see FIG. 3).

Upon completion of step S14, 4-D rendering reproduction (or analysis) is performed (at step S15). In step S15, the three-dimensional time-varying image is displayed. Specifically, as shown in FIG. 9, interpolation data is not present between Phase 1 and Phase 2, and three-dimensional images in Phase 1 are continuously displayed therebetween. After that, interpolation data (or synthetic interpolation data) is present between Phase 2 and Phase 3, and, in the target range, three-dimensional images based on the interpolation data are displayed therebetween, while, outside the target range, three-dimensional images in Phase 2 are displayed therebetween. After that, interpolation data is not present between Phase 3 and Phase 4, and three-dimensional images in Phase 3 are continuously displayed therebetween.

As described above, a discrimination is made between a non-feature region (for example, the non-calcified region R1) and a feature region (for example, the calcified region R2) in the group D1 of captured image volume data sequenced in time series, and correction processing based on nonlinear alignment is performed on the non-feature region, while interpolation processing based on linear alignment is performed on the feature region. This eliminates a change in shape of a feature part (for example, a calcified part) in a three-dimensional time-varying image, thus enabling accurate diagnosis of influences upon the feature part and its surroundings. Also, the interpolation processing is performed only on a certain target range, thus enabling reductions in the processing time and the amount of memory used.

Second Example

Description will be given with reference to FIGS. 10 and 11 with regard to Second Example in which the above-described second or third decision method and fourth decision method (see FIG. 6) are used in combination as the method for determining a target range. Incidentally, captured image volume data is illustrated in FIG. 11 by way of example as having Phases 1 to 4, as is the case with FIG. 9.

Figure 10:
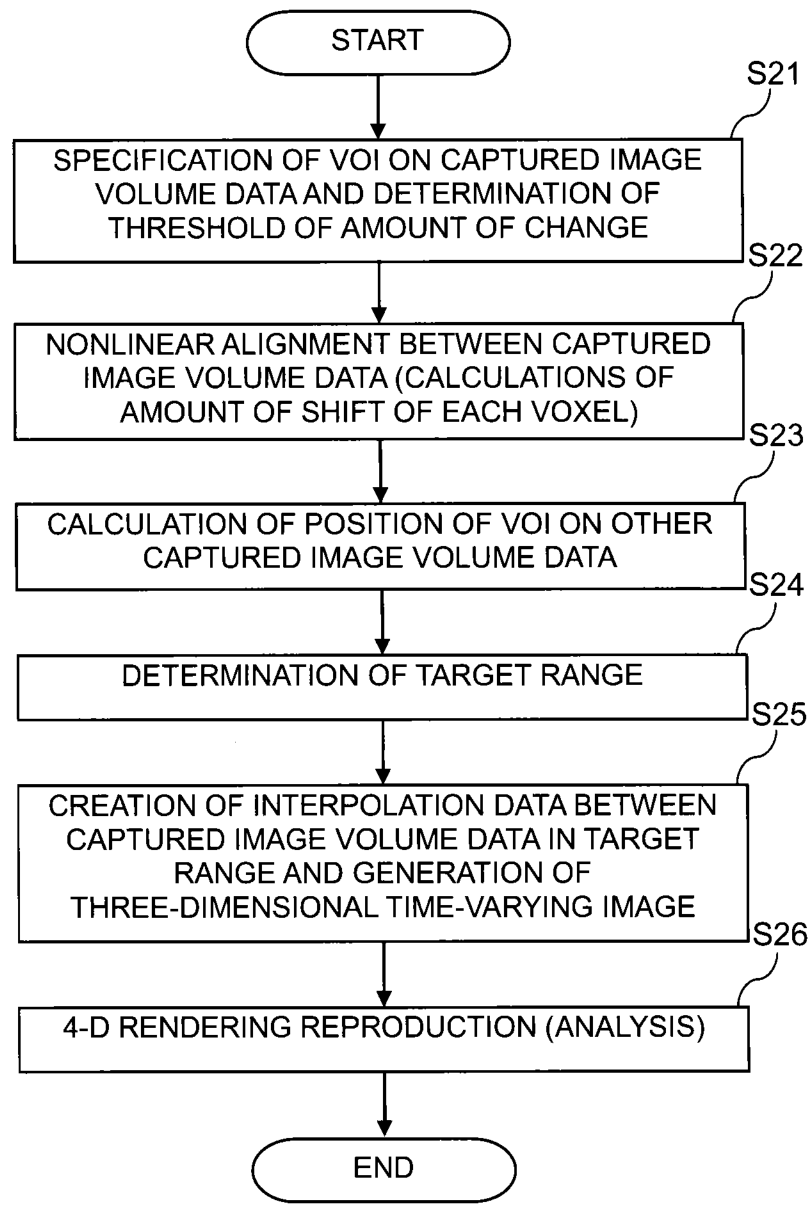
FIG. 10 is a flowchart showing a flow of image processing and display processing in Second Example.
Figure 11:
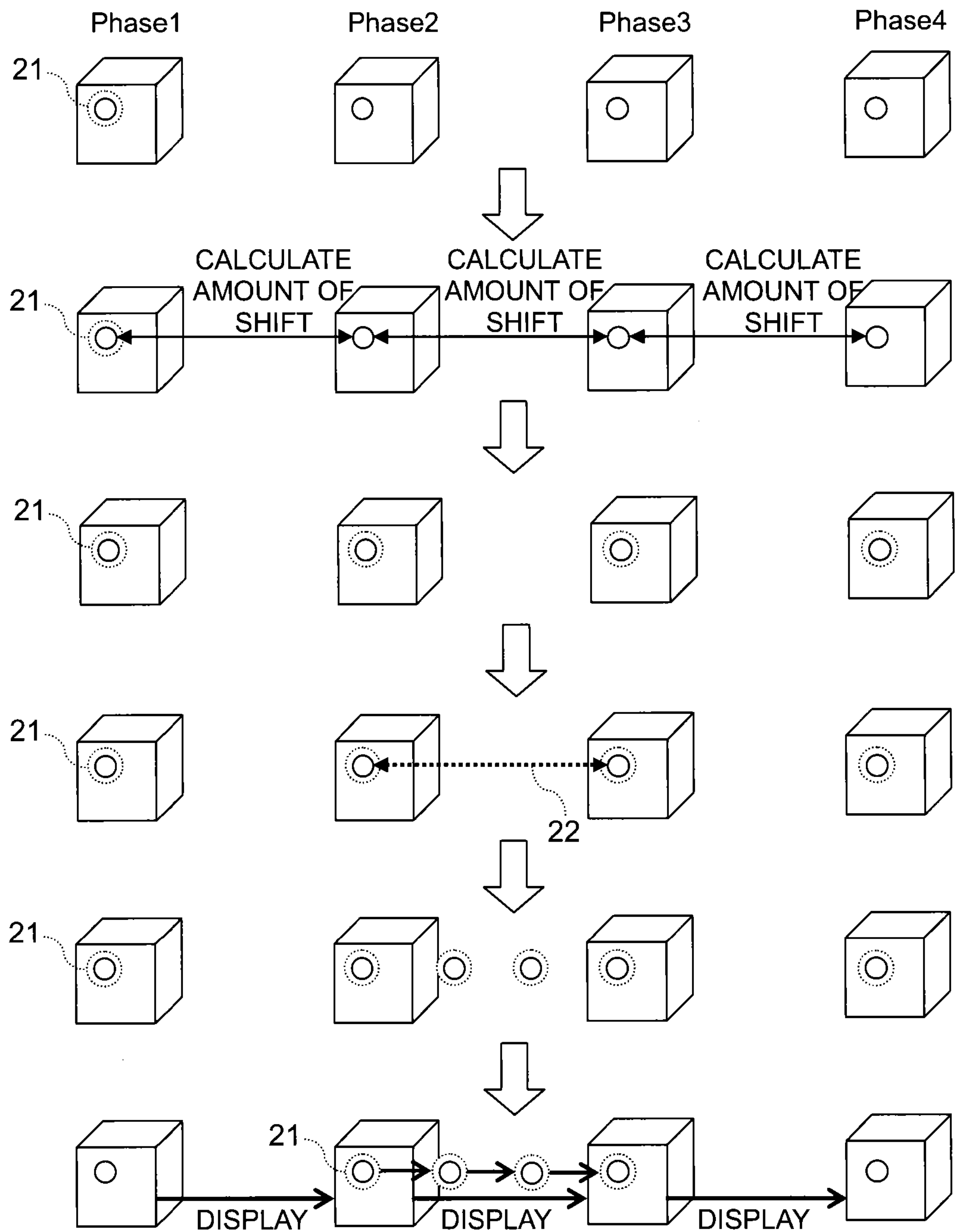
FIG. 11 is an explanatory diagram of assistance in describing the image processing and the display processing shown in FIG. 10.

As shown in FIG. 10, the specification of VOI on captured image volume data and the determination of a threshold of the amount of change are performed (at step S21). In step S21, the target region setting unit 8*i* sets the VOI according to input operations which the operator performs on the operation unit 5, and further, the threshold-of-amount-of-change setting unit 8*h* sets the threshold of the amount of change according to the input operations.

For example, when the operator operates the operation unit 5 to press the ROI image drawing button 12 in the setting image G1 (see FIG. 7) and draw an image of the ROI 12*a* on the three-dimensional image G1*a* or to press the object selection button 13 and select an object, the ROI 12*a* or the selected object is set as a space region of a processing object. Thereby, as shown for example in FIG. 11, the VOI 21 is set in captured image volume data in Phase 1. Also, when the operator operates the operation unit 5 to enter a numeric value into the input space 11 in the setting image G1, the numeric value is set as the threshold of the amount of change.

Upon completion of step S21, nonlinear alignment between captured image volume data is performed (at step S22). In step S22, in the same manner as First Example, as shown in FIG. 11, the nonlinear alignment between the captured image volume data, or equivalently, calculations of the amount of shift of each voxel, is performed to obtain nonlinear shift amount information as calculated results.

Upon completion of step S22, the position of VOI on other captured image volume data is calculated (at step S23). In step S23, as shown in FIG. 11, the position of the VOI on captured image volume data other than that in Phase 1, or equivalently, on captured image volume data in Phases 2 to 4, is also set based on the position of the VOI set by step S21.

Upon completion of step S23, a target range is determined (at step S24). In step S24, the target range decision unit 8*g* determines the target range as an object of processing from the group D1 of captured image volume data. Specifically, as shown in FIG. 11, a time period having a larger amount of shift in the VOI 21 than the threshold of the amount of change set according to step S21 is determined as the TOI 22, based on the nonlinear shift amount information obtained by step S22, and the VOI 21 and the TOI 22 are determined as the target range of the processing object. Incidentally, in FIG. 11, the TOI 22 is present between Phase 2 and Phase 3.

Upon completion of step S24, the creation of interpolation data between captured image volume data in the target range and the generation of time-series three-dimensional images are performed (at step S25). In step S25, as shown in FIG. 11, the above-described interpolation processing (see FIG. 3) is performed on the captured image volume data in the target range. However, the processing of step S1 shown in FIG. 3 is omitted since the processing has been executed at step S22, as is the case with First Example. Thereby, interpolation volume data in the target range, or equivalently, feature region interpolation data and non-feature region interpolation data, are generated, and the generated data are three-dimensionally synthesized to produce a three-dimensional time-varying image formed of three-dimensional images sequenced in time series (see FIG. 3).

Upon completion of step S25, 4-D rendering reproduction (or analysis) is performed (at step S26). In step S26, the three-dimensional time-varying image is displayed. Specifically, as shown in FIG. 11, interpolation data is not present between Phase 1 and Phase 2, and three-dimensional images in Phase 1 are continuously displayed therebetween. After that, interpolation data (or synthetic interpolation data) is present between Phase 2 and Phase 3, and, in the target range, three-dimensional images based on the interpolation data are displayed therebetween, while, outside the target range, three-dimensional images in Phase 2 are displayed therebetween. After that, interpolation data is not present between Phase 3 and Phase 4, and three-dimensional images in Phase 3 are continuously displayed therebetween.

As described above, in the same manner as First Example, a discrimination is made between a non-feature region (for example, the non-calcified region R1) and a feature region (for example, the calcified region R2) in the group D1 of captured image volume data sequenced in time series, and correction processing based on nonlinear alignment is performed on the non-feature region, while interpolation processing based on linear alignment is performed on the feature region. This eliminates a change in shape of a feature part (for example, a calcified part) in a three-dimensional time-varying image, thus enabling accurate diagnosis of influences upon the feature part and its surroundings. Also, the interpolation processing is performed only on a certain target range, thus enabling reductions in the processing time and the amount of memory used.

Third Example

Description will be given with reference to FIGS. 12 and 13 with regard to Third Example in which the above-described first and seventh decision methods (see FIG. 6) are used in combination as the method for determining a target range. Incidentally, captured image volume data is illustrated in FIG. 13 by way of example as having Phases 1 to 4, as is the case with FIGS. 9 and 11.

Figure 12:
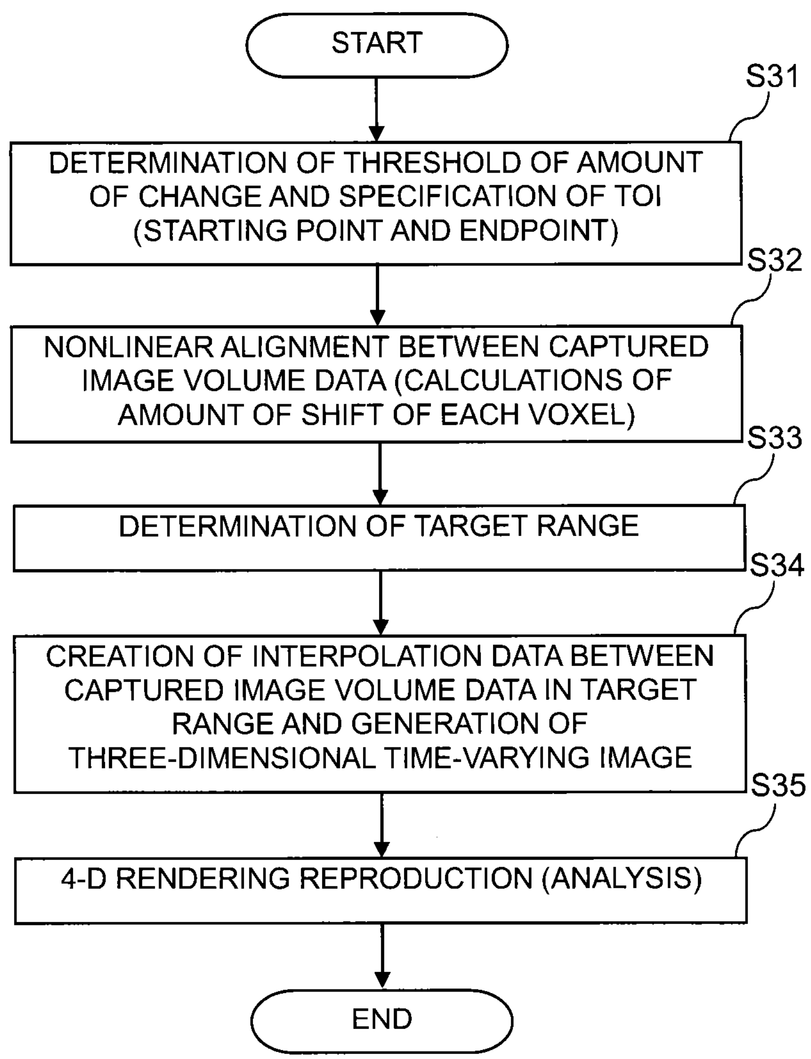
FIG. 12 is a flowchart showing a flow of image processing and display processing in Third Example.
Figure 13:
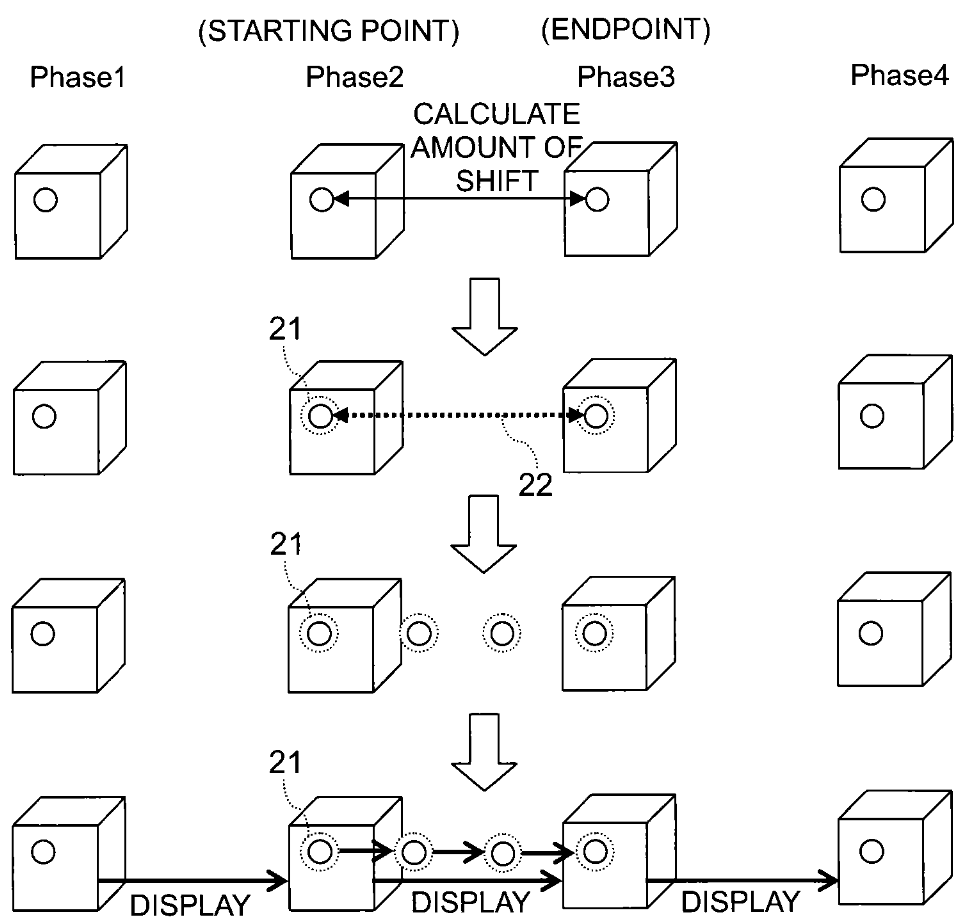
FIG. 13 is an explanatory diagram of assistance in describing the image processing and the display processing shown in FIG. 12.

As shown in FIG. 12, the determination of a threshold of the amount of change and the specification of TOI are performed (at step S31). In step S31, the threshold-of-amount-of-change setting unit 8*h* sets the threshold of the amount of change according to input operations which the operator performs on the operation unit 5, and further, the target time setting unit 8*j* sets the TOI according to the input operations.

For example, when the operator operates the operation unit 5 to enter a numeric value into the input space 11 in the setting image G1 (see FIG. 7), the numeric value is set as the threshold of the amount of change. Also, when the operator operates the operation unit 5 to effect sliding movement of the start bar 14 and the end bar 15 in the setting image G1 and thereby specify the start time (or a starting point) and the end time (or an endpoint), this specified time period is set as the TOI 22. Thereby, as shown for example in FIG. 13, a time period between Phase 2 and Phase 3 is set as the TOI 22.

Upon completion of step S31, nonlinear alignment between captured image volume data is performed (at step S32). In step S32, as shown in FIG. 13, the nonlinear alignment between the captured image volume data in the TOI 22, or equivalently, calculations of the amount of shift of each voxel, is performed to obtain nonlinear shift amount information as calculated results.

Upon completion of step S32, a target range is determined (at step S33). In step S33, the target range decision unit 8*g* determines the target range as an object of processing from the group of captured image volume data in the TOI 22. Specifically, as shown in FIG. 13, a region of a group of voxels having larger amounts of shift in the TOI 22 than the threshold of the amount of change set according to step S31 is determined as the VOI 21, based on the nonlinear shift amount information obtained by step S32, and the VOI 21 and the TOI 22 are determined as the target range of the processing object.

Upon completion of step S33, the creation of interpolation data between captured image volume data in the target range and the generation of time-series three-dimensional images are performed (at step S34). In step S34, as shown in FIG. 13, the above-described interpolation processing (see FIG. 3) is performed on the captured image volume data in the target range. However, the processing of step S1 shown in FIG. 3 is omitted since the processing has been executed at step S32, as is the case with First and Second Examples. Thereby, interpolation volume data in the target range, or equivalently, feature region interpolation data and non-feature region interpolation data, are generated, and the generated data are three-dimensionally synthesized to produce a three-dimensional time-varying image formed of three-dimensional images sequenced in time series (see FIG. 3).

Upon completion of step S34, 4-D rendering reproduction (or analysis) is performed (at step S35). In step S35, the three-dimensional time-varying image is displayed. Specifically, as shown in FIG. 13, interpolation data is not present between Phase 1 and Phase 2, and three-dimensional images in Phase 1 are continuously displayed therebetween. After that, interpolation data (or synthetic interpolation data) is present between Phase 2 and Phase 3, and, in the target range, three-dimensional images based on the interpolation data are displayed therebetween, while, outside the target range, three-dimensional images in Phase 2 are displayed therebetween. After that, interpolation data is not present between Phase 3 and Phase 4, and three-dimensional images in Phase 3 are continuously displayed therebetween.

As described above, in the same manner as First and Second Examples, a discrimination is made between a non-feature region (for example, the non-calcified region R1) and a feature region (for example, the calcified region R2) in the group D1 of captured image volume data sequenced in time series, and correction processing based on nonlinear alignment is performed on the non-feature region, while interpolation processing based on linear alignment is performed on the feature region. This eliminates a change in shape of a feature part (for example, a calcified part) in a three-dimensional time-varying image, thus enabling accurate diagnosis of influences upon the feature part and its surroundings. Also, the interpolation processing is performed only on a certain target range, thus enabling reductions in the processing time and the amount of memory used.

Processing such as First to Third Examples is executed according to what is diagnosed. For example, processing for limiting the range of space, such as the specification of VOI, is executed for purposes of reproduction of an aortic valve region alone with high time resolution, because observation of movement of the cardiac muscle is not necessary for diagnosis of the aortic valve. Also, processing for limiting the range of space, such as the determination of a region having a large amount of change, is executed for purposes of reproduction of a heart region alone with high time resolution, because the aorta, the pulmonary vein and the like make little movement. Processing for limiting the range of time, such as the determination of a time period having a large amount of change, is executed for purposes of reproduction of a time period for angiography alone with high time resolution, because observation outside the time for angiography is not necessary.

Thus, the limited range of time and space, or equivalently, the target range, can be displayed alone at high time resolution, thus enabling a significant reduction in the processing time for correction calculation and hence achieving an improvement in efficiency of diagnosis. Also, real-time rendering during 4-D reproduction becomes possible, and thus, during the reproduction, conditions for image display may be interactively changed for observation. Further, even if data is captured with low doses or with low time resolution, the range of interest alone is displayed at high time resolution thereby to enable 4-D reproduction or analysis of the data with sufficient time resolution.

As described above, the medical image processing apparatus 1 according to the embodiment includes the region setting unit 8*b* configured to set a feature region (for example, the calcified region R2) on plural captured image volume data captured in time series; the non-feature region interpolation data generator 8*c* configured to generate non-feature region interpolation data between the captured image volume data in anon-feature region (for example, the non-calcified region R1) which is a region other than the feature region, by nonlinear alignment; the feature region interpolation data generator 8*d* configured to generate feature region interpolation data between the captured image volume data in the feature region by linear alignment; the synthetic interpolation data generator 8*e* configured to generate synthetic interpolation data by three-dimensionally synthesizing the non-feature region interpolation data and the feature region interpolation data; and the image generator 8*f* configured to generate a three-dimensional time-varying image formed of three-dimensional images sequenced in time series, by using the synthetic interpolation data and the plural captured image volume data. Thus, a discrimination is made between a non-distorted feature region and a non-feature region in the group D1 of captured image volume data sequenced in time series, and correction processing based on nonlinear alignment is performed on the non-feature region, while interpolation processing based on linear alignment is performed on the feature region. This eliminates a change in shape of a non-distorted feature part in a three-dimensional time-varying image, thus enabling accurate diagnosis of influences upon the non-distorted feature part and its surroundings.

Also, the feature region interpolation data generator 8*d* shifts the position of a center of gravity of the feature region by nonlinear alignment and shifts the feature region in itself by linear alignment thereby to generate the feature region interpolation data. This enables preventing a change in shape of the feature region with reliability, as well as achieving accurate shift of the feature region.

Also, the medical image processing apparatus 1 includes the target range decision unit 8*g* configured to determine a target range as an object of processing by the region setting unit 8*b*, the feature region interpolation data generator 8*d* and the non-feature region interpolation data generator 8*c*, from the plural captured image volume data captured in time series. Thereby, the interpolation processing is performed only on the determined target range, thus enabling reductions in the processing time and the amount of memory used.

Also, the target range decision unit 8*g* determines a space region as the target range. Thereby, the range of space is limited to thus enable achieving a reduction in the processing time.

Also, the target range decision unit 8*g* determines a time period as the processing object. Thereby, the range of time is limited to thus enable achieving a reduction in the processing time.

Also, the target range decision unit 8*g* determines a region having a larger amount of change between the captured image volume data than a threshold value, as the space region. Thereby, when it is desired to diagnose a location having a large amount of change, the location can be reliably determined as the target range of interpolation processing. Further, the automatic determination of the space region enables improving in the efficiency of diagnosis.

Also, the target range decision unit 8*g* determines a time period having a larger amount of change between the captured image volume data than a threshold value, as the above-described time period. Thereby, when it is desired to diagnose a location having a large amount of change, the location can be reliably determined as the target range of interpolation processing. Further, the automatic determination of the time period enables improving in the efficiency of diagnosis.

Also, the target range decision unit 8*g* may determine the time period based on a change in pixel value of certain tissue in the plural captured image volume data. Thereby, for example, when it is desired to do diagnosis only during a time period for angiography by contrast media, the time period can be reliably determined as the target range of interpolation processing.

Also, the target range decision unit 8*g* may determine the time period based on a change in pixel value of certain tissue in time-series image data which is different from the plural captured image volume data. Thereby, for example, the time period can be determined not only from the captured image volume data but also from various other medical image data.

Also, the target range decision unit 8*g* determines the time period based on a change in value of time-series non-image data. Thereby, for example, the time period can be determined from an electrocardiographic waveform as the non-image data.

Also, the target range decision unit 8*g* determines a space region as the target range according to input operations which the operator performs on the operation unit 5. This enables the diagnostician to set a desired space region as the target range, and thus can ensure that the diagnostician diagnoses a location in the desired space region.

Also, the target range decision unit 8*g* determines a time period as the processing object according to input operations which the operator performs on the operation unit 5. This enables the diagnostician to set a desired time period as the target range, and thus can ensure that the diagnostician diagnoses a location in the desired time period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus for visualization of each of a plurality of captured image volume data having time of day information, comprising:

a generator configured to generate interpolation volume data for interpolation in the plurality of captured image volume data, based on the plurality of captured image volume data; and a display unit configured to visualize and display the plurality of captured image volume data and the interpolation volume data, wherein the generator is configured to extract a non-distorted feature region in the captured image volume data, shift a position of a center of gravity of the feature region and shift the feature region by linear alignment based on the position of the center of gravity shifted, so as to suppress a change in shape of the feature region that occurs with time, thereby performing interpolation with respect to the feature region to generate first region interpolation data, shift other regions than the feature region by nonlinear alignment such that a change in shape of the other regions occurs, thereby performing interpolation with respect to the other regions to generate second region interpolation data, and synthesize the first region interpolation data and the second region interpolation data to generate interpolation volume data.

2. A medical image processing apparatus comprising:

region setting circuitry configured to set a non-distorted feature region on a plurality of captured image volume data captured in time series;

a feature region interpolation data generator configured to shift a position of a center of gravity of the feature region and shift the feature region by linear alignment based on the position of the center of gravity shifted so as to suppress a change in shape of the feature region that occurs with time, thereby performing interpolation with respect to the feature region to generate feature region interpolation data;

a non-feature region interpolation data generator configured to shift other regions than the feature region by nonlinear alignment such that a change in shape of the other regions occurs, thereby performing interpolation with respect to the other regions to generate non-feature region interpolation data;

a synthetic interpolation data generator configured to generate synthetic interpolation data by three-dimensionally synthesizing the feature region interpolation data and the non-feature region interpolation data; and an image generator configured to generate a three-dimensional time-varying image formed of three-dimensional images sequenced in time series, by using the synthetic interpolation data and the plurality of captured image volume data, wherein the feature region interpolation data generator shifts a position of a center of gravity of the feature region by nonlinear alignment and shifts the feature region in itself by linear alignment to thereby generate the feature region interpolation data.

3. The medical image processing apparatus according to claim 2, comprising target range decision circuitry configured to determine a target range as an object of processing by the region setting circuitry, the feature region interpolation data generator and the non-feature region interpolation data generator, from the plurality of captured image volume data.

4. The medical image processing apparatus according to claim 3, wherein the target range decision circuitry determines a space region as the target range.

5. The medical image processing apparatus according to claim 3, wherein the target range decision circuitry determines a time period as the processing object.

6. The medical image processing apparatus according to claim 4, wherein the target range decision circuitry determines a region having a larger amount of change between the captured image volume data than a threshold value, as the space region.

7. The medical image processing apparatus according to claim 5, wherein the target range decision circuitry determines a time period having a larger amount of change between the captured image volume data than a threshold value, as the time period.

8. The medical image processing apparatus according to claim 5, wherein the target range decision circuitry determines the time period based on a change in pixel value of certain tissue in the plurality of captured image volume data.

9. The medical image processing apparatus according to claim 5, wherein the target range decision circuitry determines the time period based on a change in pixel value of certain tissue in time-series image data which is different from the plurality of captured image volume data.

10. The medical image processing apparatus according to claim 5, wherein the target range decision circuitry determines the time period based on a change in value of time-series non-image data.

11. The medical image processing apparatus according to claim 3, comprising an operation unit on which an operator performs input operations, wherein the target range decision circuitry determines a space region as the target range according to the input operations which the operator performs on the operation unit.

12. The medical image processing apparatus according to claim 3, comprising an operation unit on which an operator performs input operations, wherein the target range decision circuitry determines a time period as the processing object according to the input operations which the operator performs on the operation unit.

13. The medical image processing apparatus according to claim 2, wherein the feature region interpolation data generator is configured to shift the position of the center of gravity of the feature region by nonlinear alignment and shift the feature region by linear alignment to generate the feature region interpolation data.

14. The medical image processing apparatus according to claim 13, further comprising target range decision circuitry configured to determine a target range as an object of processing by the region setting circuitry, the feature region interpolation data generator, and the non-feature region interpolation data generator, from the plurality of captured image volume data.

15. A medical image processing apparatus comprising:

target range decision circuitry configured to determine a target range as an object of processing from a plurality of captured image volume data captured in time series; and an image generator configured to generate a three-dimensional time-varying image formed of three-dimensional images sequenced in time series, by interpolating new volume data between the captured image volume data in the target range, wherein the image generator is configured to extract a non-distorted feature region in the captured image volume data in the target range, shift a position of a center of gravity of the feature region and shift the feature region by linear alignment based on the position of the center of gravity shifted, so as to suppress a change in shape of the feature region that occurs with time, thereby performing interpolation with respect to the feature region to generate first region interpolation data, shift other regions than the feature region by nonlinear alignment such that a change in shape of the other regions occurs, thereby performing interpolation with respect to the other regions to generate second region interpolation data, and synthesize the first region interpolation data and the second region interpolation data to generate interpolation volume data.

* * * * *